United States Patent
Boulot

(10) Patent No.: US 6,853,297 B2
(45) Date of Patent: Feb. 8, 2005

(54) SAFETY INSERT WITH INCORPORATED TRANSMISSION ANTENNA

(75) Inventor: Jean-Francis Boulot, Pont du Château (FR)

(73) Assignee: Michelin Recherche et Technique S.A., Granges-Paccot (CH)

(*) Notice: Subject to any disclaimer, the term of this patent is extended or adjusted under 35 U.S.C. 154(b) by 68 days.

(21) Appl. No.: 10/437,798

(22) Filed: May 13, 2003

(65) Prior Publication Data

US 2004/0011446 A1 Jan. 22, 2004

Related U.S. Application Data

(63) Continuation of application No. PCT/EP01/12692, filed on Nov. 2, 2001.

(30) Foreign Application Priority Data

Nov. 3, 2000 (FR) .............................................. 00 14678

(51) Int. Cl.⁷ .......................... B60C 23/02; B60C 17/00
(52) U.S. Cl. ...................... 340/442; 340/445; 340/447; 340/448; 73/146.4; 116/34 R; 200/61.22; 152/152.1; 152/158; 152/516; 152/520
(58) Field of Search .............................. 340/442, 445, 340/447, 448; 73/146, 146.4, 146.5; 116/34 R, 34 B; 200/61.22; 152/158, 516, 520, 152.1

(56) References Cited

U.S. PATENT DOCUMENTS

| 5,285,189 A | 2/1994 | Nowicki et al. ............. 340/447 |
| 5,541,574 A | 7/1996 | Lowe et al. ................. 340/447 |
| 5,600,301 A | 2/1997 | Robinson, III .............. 340/442 |
| 5,838,229 A | 11/1998 | Robinson, III .............. 340/442 |
| 6,463,972 B1 | 10/2002 | Lacour ........................ 152/158 |

FOREIGN PATENT DOCUMENTS

| EP | 701911 | 3/1996 |
| EP | 0775601 | 5/1997 |
| WO | 9420317 | 9/1994 |
| WO | 0007834 | 2/2000 |

Primary Examiner—Donnie L. Crosland
(74) Attorney, Agent, or Firm—Fitzpatrick, Cella, Harper & Scinto

(57) ABSTRACT

A safety insert comprising a substantially circumferential base intended to come into contact with an adapted wheel rim, a substantially circumferential body intended to support a tread of a tire mounted on the rim during rolling with a pressure capable of causing at least partial flattening of a portion of the tire, and a housing intended to receive a wheel unit, characterized in that the safety insert comprises an aerial which is rigidly connected to the insert and is disposed inside its volume.

15 Claims, 4 Drawing Sheets

US 6,853,297 B2

SAFETY INSERT WITH INCORPORATED TRANSMISSION ANTENNA

CROSS REFERENCE TO RELATED APPLICATIONS

This is a continuation of international application No. PCT/EP01/12692, filed Nov. 2, 2001, published in French as international publication No. WO 02/38400 on May 16, 2002 and claiming priority to French application No. 00/14678 filed Nov. 13, 2000, the entire contents of each which are incorporated herein by reference.

BACKGROUND OF THE INVENTION

Field of the Invention

The invention relates to systems of transmitting data, particularly of a technical nature, from a rotary part to a non-rotary part of a vehicle. These may be data relating to physical parameters, including parameters such as pressure, temperature, friction, and wear. The invention relates more particularly to wheel units, safety inserts, and the aerials of these systems and their installation on vehicle wheels.

For example, the invention may be used with a safety system intended to warn the driver of a vehicle of the condition of tires of the vehicle, such as loss of pressure in one of the tires of the vehicle.

WO 94/20 317 and U.S. Pat. No. 5,600,301 disclose a system comprising, for each wheel, a wheel unit with at least one pressure sensor, power supply means, a high-frequency transmitter and an aerial. As shown in FIG. 2 of WO 94/20 317, this wheel unit is fixed to the wheel valve. Such fixing may entail problems during assembly and dismantling of the tires on the wheels, particularly if the valve hole is not disposed in the external side of the rim well, such as in, for example, the wheel disclosed in patent EP 701 911. In this system, it is necessary to follow a specific assembly/dismantling procedure in order to take into account the presence of the wheel unit, as any inattention may lead to damage to or destruction of the units.

U.S. Pat. No. 5,285,189 discloses a system having wheel units fixed to the radially outer wall of the rim wells of the wheels by a fixing collar. This type of fixing limits the problems encountered during assembly of the tires on their wheels. However, it has been found that the unit can pivot when the vehicle is moving. Their position is therefore not known when the tires are dismantled and here too, any inattention can lead to damage to or destruction of the units. Additionally, the units are disposed immediately next to the metal wall of the rims of the wheels. This environment makes the reliability of radio transmissions between the wheel units and the central receiving and processing units disposed in the chassis of the vehicles difficult.

The patent EP 0 775 601 discloses a safety system for wheels equipped with safety inserts having wheel units disposed inside the volume of the safety insert. It has been found with such a system that there may still be difficulties in the output of radio transmissions, particularly in certain positions of the wheel unit for radio transmission relative to the vehicle chassis.

SUMMARY OF THE INVENTION

An object of the invention is to provide for a system for monitoring the tires of a vehicle.

Another object of the present invention is to provide a system of monitoring tires that avoids the problems mentioned above.

In order to achieve these objectives, the present invention provides for a safety insert comprising:

a substantially circumferential base intended to come into contact with an adapted wheel rim, a substantially circumferential body intended to support a tread of a tire mounted on the rim during rolling with a pressure capable of bringing about at least partial flattening of a portion of the tire, and a housing intended to receive a wheel unit, characterized in that the safety insert comprises an aerial rigidly connected to the insert and disposed inside its volume.

In an advantageous embodiment, the wheel unit is capable of radio transmission and comprises a radio transmitter connected to a magnetic coupling winding and the aerial comprises a magnetic coupling winding disposed close to the housing of the wheel unit.

This embodiment has the advantage of making it possible to obtain a close magnetic coupling between the coupling windings of the aerial and of the wheel unit when the wheel unit is sited in its housing. This makes it possible to use an aerial of considerable length, therefore having an excellent output superior to that which can be expected from aerials of a size compatible with that of the housings of wheel units currently being used. A further advantage is the absence of electrical contact between the aerial and the transmitter of the wheel unit.

In a preferred embodiment, the aerial is a high-output tuned aerial. This aerial may extend over only a fraction of the circumference of the insert. This means that one can easily select the length of the conductor forming the aerial in order to tune it. The aerial may also extend over the entire circumference of the insert. This has the advantage of simplifying the transmission of data between the wheel unit and a central reception and processing unit disposed in the vehicle chassis.

It is particularly advantageous to dispose the aerial, for its most part, inside the upper part of the annular body of the insert, whose diameter is larger than the maximum diameter of the wheel intended to receive the insert.

This arrangement of the aerial can substantially increase the output of the aerial, which is an important factor for limiting the energy consumption of the wheel unit when transmitting data.

The present invention also relates to an aerial adapted for insertion in a safety insert. The safety insert may comprise a substantially circumferential base intended to come into contact with an adapted wheel rim, a substantially circumferential body intended to support a tread of a tire mounted on the rim during rolling, with a pressure capable of bringing about at least partial flattening of a portion of the tire. The aerial may be formed of a conducting element whose shape and dimensions permit at least partial insertion thereof into the insert, and the aerial being so conceived as to occupy a circumferential position extending substantially beyond 180 degrees.

For example, the aerial can be fixed in an annular groove formed in a lateral wall of the upper part of the insert. The aerial can also be immersed in the upper part of the annular body.

In a preferred embodiment, the aerial and its coupling winding are formed by a single conducting wire. This has the advantage of simplifying realization of this aerial and thus of limiting the cost of the assembly.

This conductor may be a flexible and extensible conductor.

The aerial can be realized, at least in part, by applying a conductive paint to the surface of the insert.

Advantageously, the housing of the wheel unit is disposed in the annular body with immediate proximity to the base of the insert. This has the advantage of minimizing the risk of damaging the wheel unit if the tire suffers an impact while rolling or during operation while rolling on the flat.

A further object of the invention is to provide a wheel unit, intended to be disposed in a housing inside a safety insert, comprising a substantially circumferential base intended to come into contact with an adapted wheel rim and a substantially circumferential body intended to support a tread of a tire mounted on the rim during rolling, with a pressure capable of bringing about at least partial flattening of a portion of the tire. The wheel unit may comprise an element capable of detecting or reading a physical parameter of the wheel or tire, such as a pressure sensor, and a transmitter connected electrically to a magnetic coupling winding adapted to co-operate electrically with an aerial disposed inside the insert.

A further object of the invention is to provide a device for sensing the condition of a tire comprising a wheel unit disposed within the housing of the safety support.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate various embodiments of the invention and together with the description, serve to explain the principles of the invention.

DETAILED DESCRIPTION OF THE INVENTION

Reference will now be made in detail to the present invention.

Figure 1:
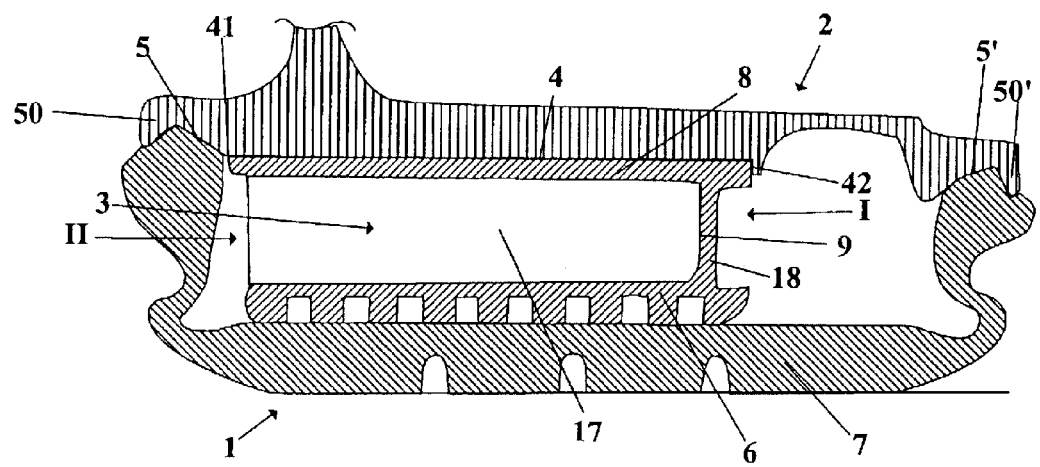
FIG. 1 shows a partial axial section of a mounted assembly equipped with a safety insert according to one embodiment of the invention.

In FIG. 1 an assembled unit can be seen which comprises a tire 1, a rim 2 and a safety insert 3 disposed around the bearing surface 4 of the rim 2. The particular geometry of this rim 2 is described in particular in U.S. Pat. No. 5,634,993. This particular rim has two rim flanges, an outer 50 and an inner 50', two bead seats, an outer 5 and an inner 5', of different diameters and a bearing surface 4 with an engaging edge 41 and a limit stop 42. This rim is particularly adapted for easy installation of the safety insert 3. This assembly permits rolling in spite of a considerable drop in pressure in the tire 1. The safety insert 3 has an axially front face 1 and an axially rear face 11. The insert comprises two main parts, a base 8 intended to encompass the bearing surface 4 of the rim 2 and a body 9 connected to the base 8. The body 9 comprises a top 6 intended to come into contact with the tread 7 of the tire 1 if there is zero or weak inflation pressure, as is shown in FIG. 1. The body 9 may have a wide variety of shapes.

Figure 2:
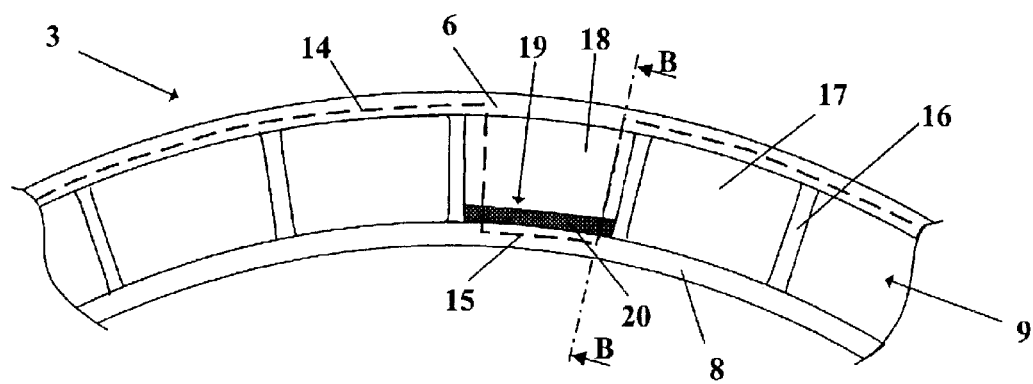
FIG. 2 shows a view from the side of the insert of FIG. 1.

FIG. 2 shows a view of the insert 3 from the side of the axially rear face 11. The body 9 of the safety insert 3 has a series of partitions 16 disposed axially or substantially axially. These partitions are regularly distributed over the circumference of the insert and connect the top 6 to the base 8. These partitions, together with the substantially circumferential run-out 18 of the body 9 (see FIG. 1), form recesses 17. One of these recesses can comprise a housing 19, which is used to fix a wheel unit 20 in the safety insert 3. This fixing may be effected in a variety of manners, such as, for example, clipping or adhesion. The wheel unit is preferably disposed in the radially lower part of the body 9 in order to limit the risk of damage due to impacts during rolling. The mount of the wheel unit is also preferably removable. In FIG. 2 an aerial 14 is also shown. This aerial extends along the circumference of the insert on either side of the wheel unit 20 in the part of the body forming the top. The aerial 14 is electrically connected to a magnetic coupling winding 15 disposed in the base 8 of the insert in immediate proximity to the wheel unit 20.

In a preferred embodiment, the aerial 14 is formed of a single conductor. In an alternative preferred embodiment, the aerial is formed of a circumferential winding.

Figure 3:
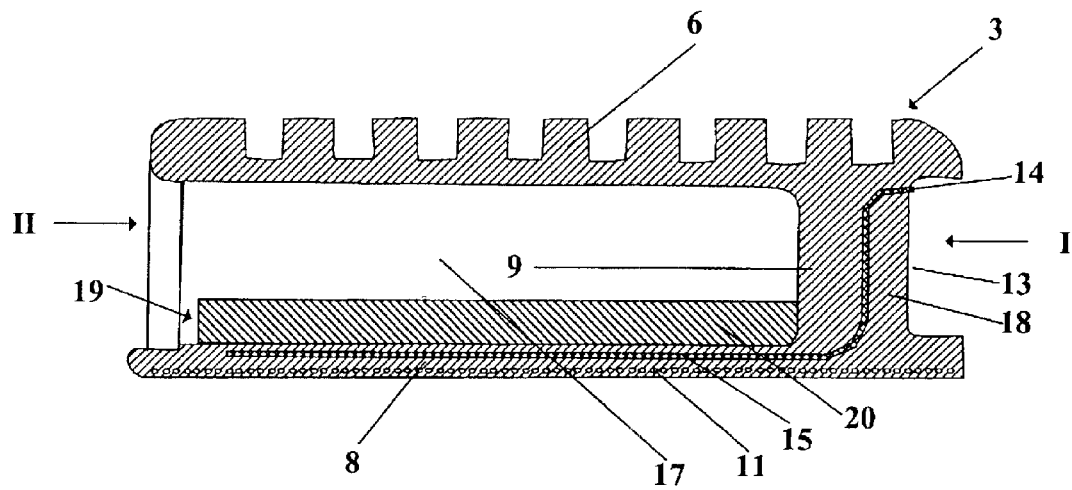
FIG. 3 shows an axial section in the region of the housing of a wheel unit of the insert of FIG. 1.

FIG. 3 shows a partial axial section through a safety insert 3 according to the invention. This section is taken in the region of B—B as is indicated in FIG. 2. The safety insert 3 optionally comprises a substantially circumferential series 11 of orientation reinforcements disposed in the base 8 in order to facilitate resistance to centrifuging of the insert when the wheel is rotating at high speed.

In FIG. 3, the aerial 14 is disposed laterally along the cavity 13 of the side 1. The cross-section shows how the aerial 14 crosses the run-out 18 in order to depart from the upper part of the body 9. The aerial extends through the run-out and joins with the coupling winding 15. In this particular embodiment, the coupling winding is a simple loop which extends in the base 8 under the housing 19 of the wheel unit 20.

Figure 4:
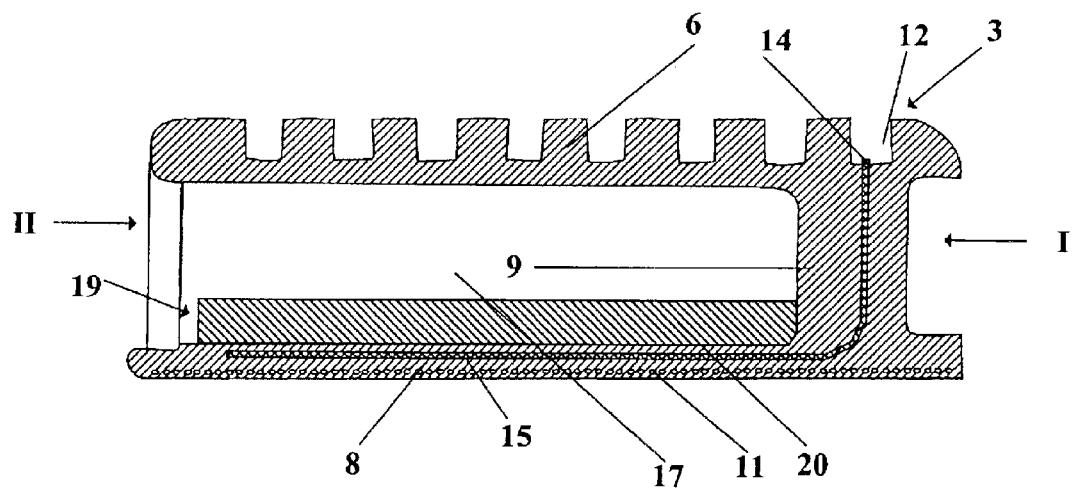
FIG. 4 shows an axial section in the region of the housing of a wheel unit of a second embodiment of an insert according to the invention.

FIG. 4 shows a slightly different embodiment of the aerial of the insert 3. This aerial 14 extends along the circumference of the insert in a circumferential cavity opening radially from the top 6.

For these two embodiments, the aerial may, in its part which opens out, be formed with conductive paint. In the part linking with the coupling winding 15, an optionally extensible conductor may be used.

Figure 5:
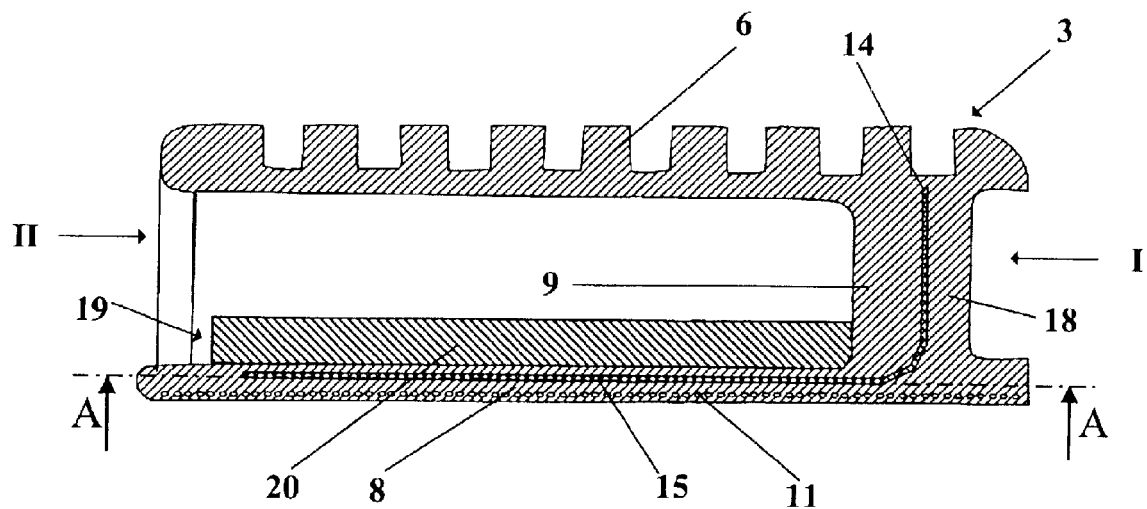
FIG. 5 shows an axial section in the region of the housing of a wheel unit of a third embodiment of an insert according to the invention.
Figure 6:
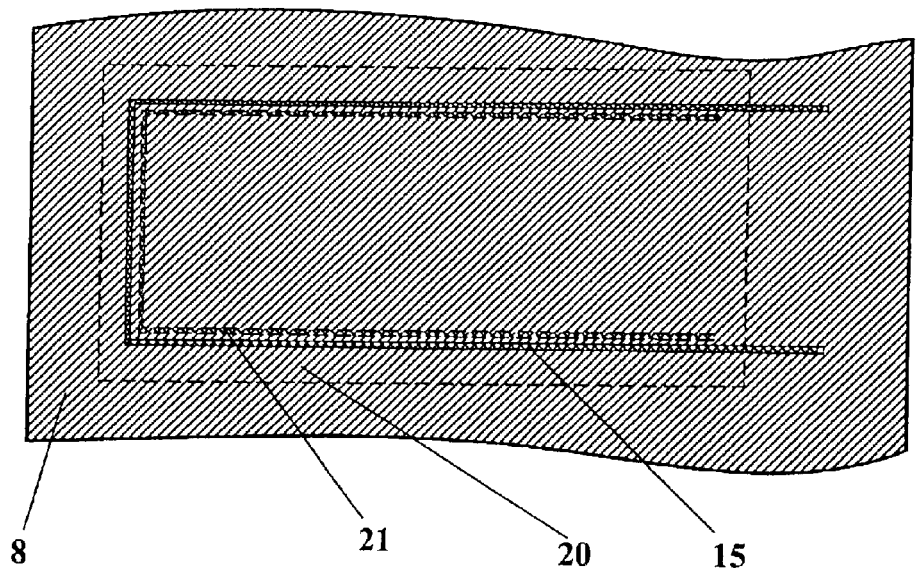
FIG. 6 shows a section along the line A—A indicated in FIG. 5 of an insert according to the invention.

FIG. 6 specifies the shape of the magnetic coupling loop 15 according to an embodiment of the invention. This figure is a circumferential section along the line A—A as indicated in FIG. 5. This section is effected in the plane of the coupling loop 15. The magnetic coupling loop 15 is sited in the base 8. In dotted lines, the wheel unit 20 is shown disposed against the radially outer surface of the base 8 with a similar coupling loop 21 disposed virtually parallel to the loop 15.

The magnetic coupling between these two loops 15 and 21 can thus be excellent, since the wheel unit 20 is sited in its housing 19. Because the wheel unit 20 is located within the housing 19, the wheel unit and the magnetic coupling winding 21 are in close proximity to the magnetic coupling winding 15.

Figure 7:
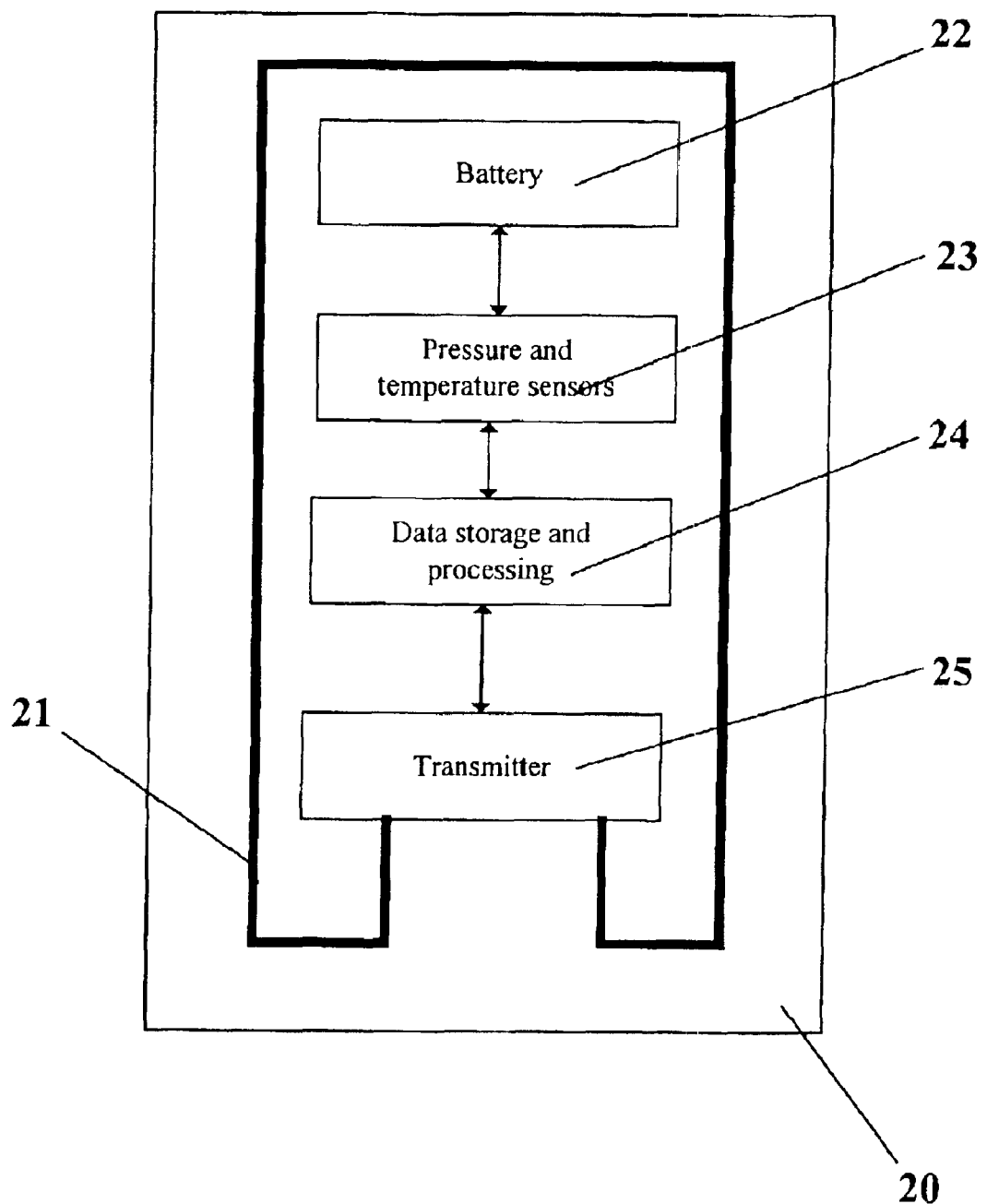
FIG. 7 provides a diagram of a wheel unit according to one embodiment of the invention.

FIG. 7 is a diagram of a wheel unit 20. This unit comprises mainly power supply means, such as a battery 22, an assembly of pressure and temperature sensors 23, data storage and processing means 24 and a high-frequency transmitter 25. The transmitter 25 is connected electrically to a coupling loop 21 which has a shape and length substantially comparable to that of the aerial disposed rigidly in the insert and helps to adapt impedance between the transmitter and the aerial.

The positioning of an aerial rigidly connected to a safety insert according to the invention has numerous advantages. The aerial and the wheel unit are protected by the safety insert during the mounting and dismantling of tires as well as during rolling. The wheel unit is easily installed in an optionally removable manner in the insert. The aerial has an excellent output due to its length and its position outside areas close to the metal parts of the rim, which helps to increase the service life of the batteries and reduces the problem of areas which are in a transmission shadow. When the aerial extends over the entire circumference of the insert, the reception conditions of the central processing unit of the monitoring system of the vehicle are substantially identical whatever the positions of the wheel in question. Finally, if when the vehicle and tires are serviced, an insert is omitted from re-assembly, the system can easily detect this omission.

A safety insert according to the invention can be composed of mixtures of rubbery or thermoplastic materials. In both cases, this insert can be realized by injection under pressure of the constituent material into a closed cavity from regularly distributed feed points. Before carrying out the injection, it is advantageous to dispose the reinforcements 11 in the closed cavity. The coupling loop of the aerial of the insert can be disposed radially on the exterior on the reinforcements 11 before injection. The remainder of the aerial can also be installed by known means in the closed cavity if it is opted to have an aerial immersed in the top 6. This remainder can also be outside the closed cavity during injection, obviously with the exception of the part linking the aerial and the coupling loop, which must be disposed in the closed cavity up to two appropriate outlet points.

If a rubbery material is used, the mold for forming the insert may be similar to that described in the patent application EP 1 000 774 A1.

The present invention can be variously modified without departing from the spirit and scope of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The disclosures of each reference cited above is herein incorporated by reference.

What is claimed is:

1. A safety insert (3) intended to support a tread of a tire (1) mounted on a wheel rim during rolling with a pressure capable of bringing about at least partial flattening of a portion of the tire, comprising:
a substantially circumferential base (8) intended to come into contact with the wheel rim (2),
a substantially circumferential annular body (9) and a housing (19) intended to receive a wheel unit (20) comprising a radio transmitter (25) connected to a first magnetic coupling winding (21),
said safety insert (3) further comprising an aerial (14) rigidly connected to the insert (3) and a second magnetic coupling winding (15) disposed in the safety insert, wherein said second magnetic coupling winding (15) is proximate to the housing (19) of the wheel unit.

2. The safety insert (3) according to claim 1, wherein, said aerial (14) is a high-output tuned aerial.

3. The safety insert (3) according to claim 2, wherein said aerial (14) extends over a fraction of the circumference of the insert.

4. The safety insert (3) according to claim 2, wherein said aerial extends over the entire circumference of the insert.

5. The safety insert (3) according to claim 1, wherein, the annular body (9) having a part of a diameter larger than the maximum diameter of the wheel intended to receive the insert, wherein a majority of said aerial is disposed within said upper part of said annular body.

6. The safety insert (3) according to claim 5, wherein the aerial (14) is fixed in an annular groove (13) formed in a lateral wall of the upper part of the insert.

7. The safety insert (3) according to claim 5, wherein the aerial (14) is immersed in the annular body (9) of the insert.

8. The safety insert (3) according to claim 1, wherein the coupling winding (15) of the aerial (14) is immersed in the base (8) of the insert.

9. The safety insert (3) according to claim 1, wherein the aerial (14) and the coupling winding (15) of the aerial are formed by a single conducting wire.

10. The safety insert (3) according to claim 1, wherein the aerial (14) is formed, at least in part, of a conductive paint applied to the surface of the insert.

11. The safety insert (3) according to claim 1, wherein the aerial (14) is formed with a flexible conductor.

12. The safety insert (3) according to claim 1, wherein the housing (19) of the wheel unit (20) is disposed in the annular body with immediate proximity to the base (8) of the insert.

13. The safety insert of claim 1 further comprising the wheel unit.

14. A wheel unit (20), intended to be disposed in a housing (19) inside a safety insert (3) comprising a substantially circumferential base (8) intended to come into contact with an adapted wheel rim (2), a substantially circumferential body (9) intended to support a tread of a tire (1) mounted on the rim during rolling with a pressure capable of causing at least partial flattening of a portion of the tire, the unit (20) comprising an element (23) capable of detecting or reading a physical parameter of the wheel or tire, such as a pressure sensor, and a transmitter (25) connected electrically to a magnetic coupling winding (21) adapted to co-operate electrically with an aerial (14) disposed in the insert.

15. The wheel unit (20) according to claim 14 co-operating electrically with an electric power element (22).

* * * * *

UNITED STATES PATENT AND TRADEMARK OFFICE
CERTIFICATE OF CORRECTION

PATENT NO. : 6,853,297 B2 Page 1 of 1
APPLICATION NO. : 10/437798
DATED : February 8, 2005
INVENTOR(S) : Jean-Francis Boulot It is certified that error appears in the above-identified patent and that said Letters Patent is hereby corrected as shown below:

ON COVER PAGE AT (30) FOREIGN APPLICATION PRIORITY DATA

"Nov. 3, 2000 (FR) ……….. 00 14678" should read --Nov. 13, 2000 (FR) ……….. 00 14678--.

COLUMN 4

Line 5, "face 1" should read --face I--;
Line 6, "face 11." should read --face II.--;
Line 14, "face 11." should read --face II.--; and
Line 44, "side 1." should read --side I.--.

Signed and Sealed this

Nineteenth Day of September, 2006

JON W. DUDAS
*Director of the United States Patent and Trademark Office*